B. KAIBEL.
SEWAGE AND REFUSE SEPARATOR.
APPLICATION FILED MAR. 29, 1913.

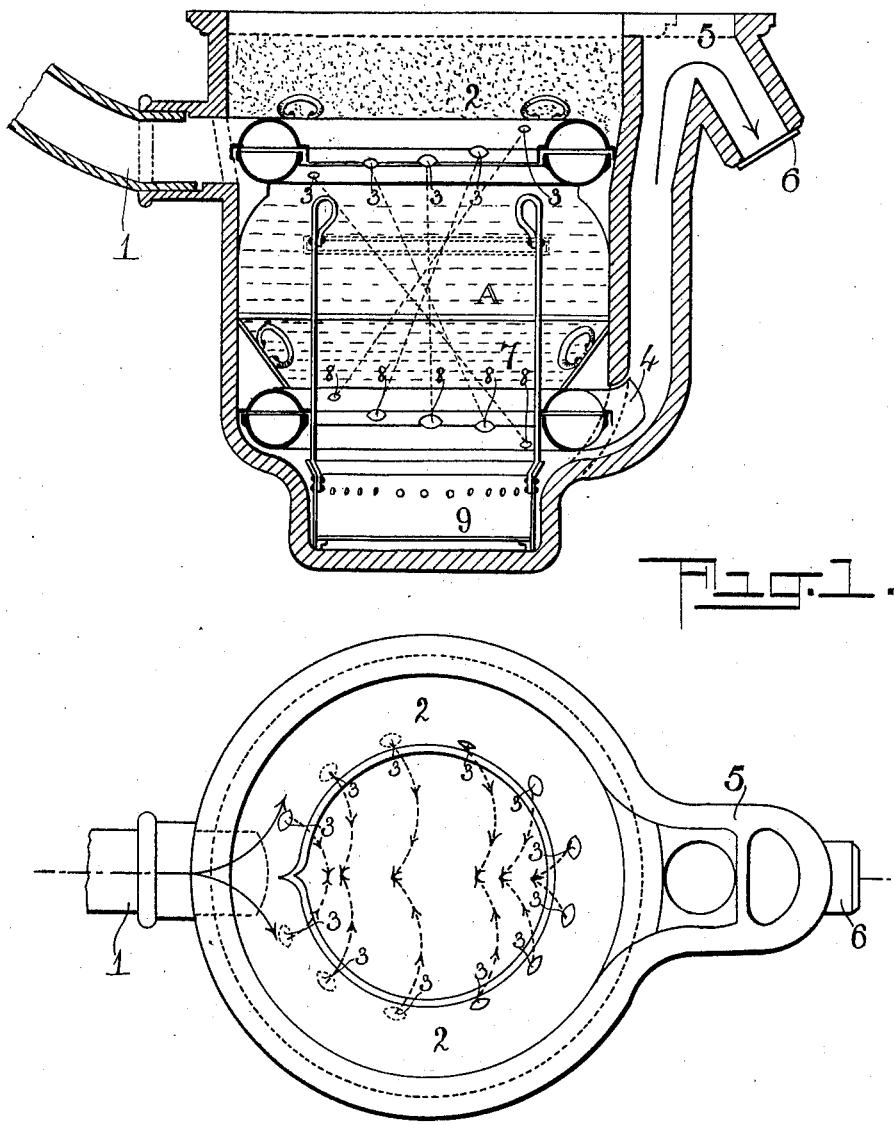

1,093,994.

Patented Apr. 21, 1914.
2 SHEETS—SHEET 2.

Attest:
Ewd L. Tolson
H. L. Alden

Inventor:
Burkhardt Kaibel,
by Spear, Middleton, Donaldson & Spear
Attys.

UNITED STATES PATENT OFFICE.

BURKHARDT KAIBEL, OF DARMSTADT, GERMANY.

SEWAGE AND REFUSE SEPARATOR.

1,093,994.   Specification of Letters Patent.   Patented Apr. 21, 1914.

Application filed March 29, 1913. Serial No. 757,697.

*To all whom it may concern:*

Be it known that I, BURKHARDT KAIBEL, a subject of the German Emperor, residing at Darmstadt, in the German Empire, have invented certain new and useful Improvements in Sewage and Refuse Separators, of which the following is a specification.

The present invention relates to sewage or refuse separators.

The object of the invention is a new clearing apparatus especially for sewage or canal water and in particular for such water as has already undergone a preliminary clearing in known apparatus to remove its coarse mechanical impurities.

The apparatus effects a better separation than has been the case with separators as heretofore constructed of the light floating oil and fat particles, and the like, from the heavy parts which are precipitated; and it offers especial advantages in being very accessible and in rendering possible the separation and removal of the specifically different deposits in the most rapid and convenient manner. At the same time the apparatus is very simple to construct and of moderate dimensions, and it is to be particularly noted that it can be built in the earth. Reference will be made later to the advantages in detail.

In order to separate the specifically lighter and heavier parts, the velocity of inflow of impure water into the apparatus is diminished by a circular change of direction and by division (bifurcation) and by subsequently uniting the threads of water in such manner that the heavier parts slowly sink and collect as a deposit which in small apparatus can be removed by known buckets which can be raised, and in large apparatus may be removed by any appropriate sludge valve. The lighter parts (oils and fats) on the other hand rise owing to this considerable diminution in velocity, when they are tapped off, skimmed off, or removed in other suitable manner.

Beyond its use in purifying canal water, the apparatus can thus be advantageously employed in collecting fat in households and kitchens generally, slaughter houses, oil and machine works.

The accompanying drawings show examples illustrative of the invention.

Figure 3:
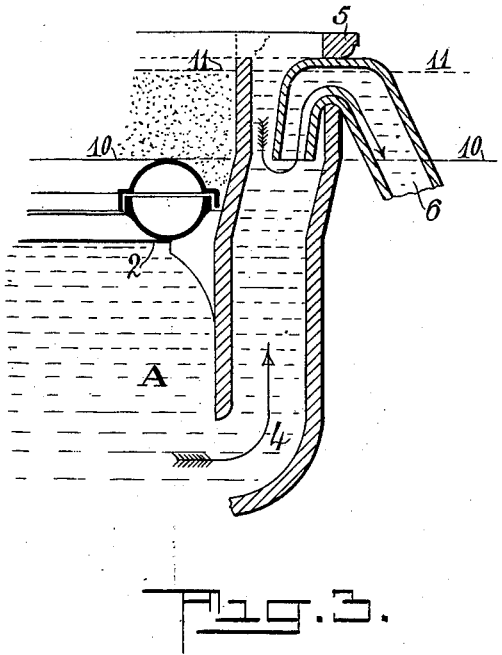
Figure 4:
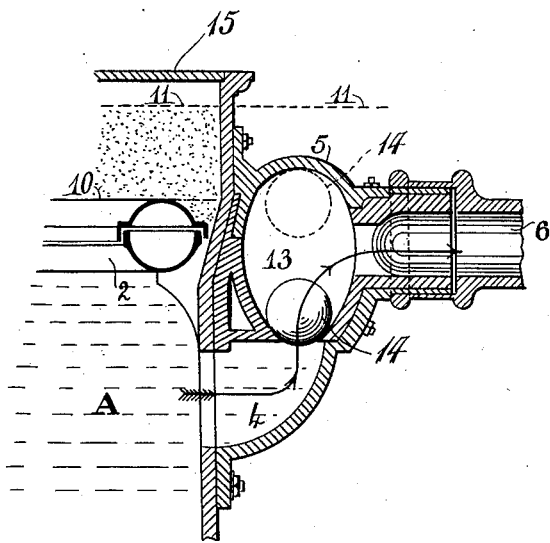

Figure 1 is a vertical longitudinal section through one form of the apparatus; Fig. 2 is a plan thereof, and Figs. 3 and 4 show modifications described below.

Impure water, after a preliminary purification, is led under natural head, or under artificial pressure, into the tube 1 through which it passes into the clearing chamber A of the apparatus; this tube branches, as soon as it reaches the apparatus, into the horizontal ring-shaped pipe or chamber 2, from which the water flows into the clearing space A through twelve uniformly distributed openings 3—3 of the total cross section of the tube 1. The openings are arranged to rise from the inflow to the opposite side, and the water issued therefrom in horizontal bow-shaped streams which are directed opposite one another in pairs, so that when they meet at the horizontal axis of the apparatus, with a speed which is already very much reduced, they lose their velocity almost entirely; by this means the oil and fats rise and the sludge falls.

In order to prevent the clear water from running toward any one point with too high a velocity, that is to say, toward the outflow opening 4 of the siphon 4, 5, 6, (water cut-off) by which means a tranquil clearing of the water and settling of the sludge would be prevented, there is arranged below, a second closed perforated horizontal ring-shaped pipe 7 connected tightly with the outflow opening of the siphon; by this means water is forced in an amount depending on the upper inflow through the inflow openings 8, 8, in the lower ring-shaped pipe 7 corresponding to the outflow openings 3, 3, in the upper ring-shaped pipe, and passes along the whole circumference of the lower pipe; and this circular path causes it to reach the siphon arrangement 4, 5, 6, very slowly, thus effecting a very tranquil and extremely productive rise of the fat on the one hand, and an equally tranquil separation and deposition of the heavy substances at the bottom.

A periodic removal of the fat and sludge do not in any way interrupt the inflow and clearing: in particular, in opposition to other clearing apparatus on the large and small scale such as grease traps, the removal of sludge from above is rendered possible in a very convenient manner without removing any constructive parts lying between. The upper halves of the circular pipes 2 and 7 can be easily lifted by handles in order to clean them in the most convenient manner.

Fig. 3 represents a form of apparatus essentially almost identical with that described, but with the difference that the outflow of clear water at the siphon 4, 5, 6, causes an intermittently varying water level in the clearing space A with periods of rest during outflow caused thereby, by means of the siphon tube 6 which is inserted therein; thus, the water level in the space A rises slowly from the height of 10 to the height of 11 and is then rapidly sucked down again through the siphon tube 6 to the height of 10 but it at once begins to rise again slowly to the height 11 and so on; during each of these slow rises of the water level no water runs from the siphon tube 6, and in this period of absolute rest there is a tranquil, very intensive, separation of the light substances upward, and the heavy substances downward. The same action, with the same equally good result, is also obtained by the excess water pressure ball valve shown in Fig. 4. In this form of the apparatus the siphon tube 6, in place of being formed as a simple bent pipe like the one shown in Fig. 3, terminates at its inner end in a chamber 5 which has a shallow closed upward extension and a deeper open bottom extension and carries a ball float 14. This ball is of such weight that when the liquid level is at 10 the ball 14 will be at the bottom of its chamber 13 and will close the bottom opening of said chamber; as the water level gradually rises, however, from 10 to 11, the ball 14 will likewise slowly rise to the top of the chamber 13. The water level will then be rapidly sucked down again through the chamber 13 and siphon tube 6, and in this manner the water level in the space A is caused to rise slowly from the height of 10 to the height of 11 and then to fall rapidly to the height of 10, whereupon it at once begins to rise again as in the form of the apparatus shown in Fig. 3 and with a like result, namely that, during the periods of rising water level, the liquid in the space A is perfectly still, and the separation of the different kinds of matter can take place quickly and very thoroughly. In this case the space A is closed at the top with a lid or cover 15.

What I claim is:—

1. In a separator the combination of a settling tank or vessel, an annular perforated pipe or chamber in said tank or vessel, means for admitting matter to be separated to said annular pipe or chamber, a second annular perforated pipe or chamber located below said first-named annular pipe or chamber with the intervention of a clear space between them and means for drawing off water from said clear space.

2. In a separator the combination of a settling tank or vessel, an annular perforated pipe or chamber in said tank or vessel, the perforations being only on its inner circumference, means for admitting matter to be separated to said annular pipe or chamber, a second annular perforated pipe or chamber located below said first-named annular pipe or chamber with the intervention of a clear space between them, and means for drawing off water from said clear space.

3. In a separator the combination of a settling tank or vessel, an annular perforated pipe or chamber in said tank or vessel, means for admitting matter to be separated to said annular pipe or chamber, means for determining a fixed water level, means for determining another fixed water level, and means controlled by said first-named water level determinant for intermittently drawing off water.

4. In a separator the combination of a settling tank or vessel, an annular perforated pipe or chamber in said tank or vessel, means for admitting matter to be separated to said annular pipe or chamber, a second annular perforated pipe or chamber located below said first-named annular pipe or chamber with the intervention of a clear space between them, means for determining a fixed water level, means for determining another fixed water level, and means controlled by said first-named water level determinant for periodically reducing the volume of water from the higher of said levels to the lower one.

5. In a separator the combination of a settling tank or vessel, an annular perforated pipe or chamber in said tank or vessel, means for admitting matter to be separated to said annular pipe or chamber, a receptacle for the sludge, means for determining a fixed water level, means for determining another fixed water level, water drawing-off means communicating with the settling tank or vessel at a point below said annular perforated pipe or chamber and so disposed as not to draw off water except when said water is at the upper or higher of the aforesaid levels and not to reduce the water below the lower of the aforesaid levels so as to insure intermittent drawing off of water and quiescence in the intervals of drawing-off.

6. In a separator the combination of a settling tank or vessel, an annular perforated pipe or chamber in said tank or vessel, means for admitting matter to be separated to said annular pipe or chamber, a second annular perforated pipe or chamber located below said first-named annular pipe or chamber with the intervention of a clear space between them, means for drawing off water from said clear space, a removable receptacle for the sludge, and means for removing the sludge.

7. In a separator the combination of a settling tank or vessel, an annular perforated pipe or chamber in said tank or vessel, means for admitting matter to be separated, to said annular pipe or chamber, siphonic drawing-off means communicating with said tank or vessel at a point below said annular pipe or chamber, a second annular pipe or chamber located below said first-named annular pipe or chamber with the intervention of a clear space between them, and a receptacle for the sludge.

In testimony whereof, I have affixed my signature in presence of two witnesses.

BURKHARDT KAIBEL.

Witnesses:
August Buick,
Franz Wucherpfennig.